United States Patent [19]
Horibata et al.

[11] Patent Number: 5,801,313
[45] Date of Patent: Sep. 1, 1998

[54] CAPACITIVE SENSOR

[75] Inventors: Kenji Horibata, Wako; Toshihiko Omi; Fumihiko Sato, both of Tsukuba, all of Japan

[73] Assignee: Omron Corporation, Kyoto, Japan

[21] Appl. No.: 653,301

[22] Filed: May 24, 1996

[30]  Foreign Application Priority Data

May 26, 1995 [JP] Japan ................... 7-151148

[51] Int. Cl.[6] .................. G01L 9/12; G01P 15/125
[52] U.S. Cl. ................ 73/718; 73/724; 73/514.32; 361/283.4
[58] Field of Search .............. 73/514.32, 654, 73/718, 724; 361/283.4

[56]  References Cited

U.S. PATENT DOCUMENTS

| 4,336,567 | 6/1982 | Anastasia ................. 73/718 |
| 4,691,575 | 9/1987 | Sonderegger et al. ........... 73/756 |
| 4,949,581 | 8/1990 | Rud ..................... 73/718 |
| 5,008,774 | 4/1991 | Bullis et al. ............. 73/514.32 |
| 5,209,118 | 5/1993 | Jerman .................. 73/715 |
| 5,441,300 | 8/1995 | Yokota et al. ........... 73/514.32 |

FOREIGN PATENT DOCUMENTS

| 0 385 574 | 1/1990 | European Pat. Off. . |
| 0 430 676 | 11/1990 | European Pat. Off. . |
| 0 402 818 | 12/1990 | European Pat. Off. . |
| 0 528 551 | 2/1993 | European Pat. Off. . |
| 2 101 331 | 1/1983 | United Kingdom . |

*Primary Examiner*—John E. Chapman
*Attorney, Agent, or Firm*—Foley & Lardner

[57]  ABSTRACT

To provide a capacitive sensor which produces a sensor output excellent in linearity. The capacitive sensor comprises a first semiconductor substrate and a second substrate. The first semiconductor substrate is formed with a frame portion and a diaphragm portion serving as a movable electrode, and bonded with the second substrate at the upper surface of the frame portion by anodic bonding. The second substrate is provided with a fixed electrode on a surface facing the diaphragm portion. A fixing projection is provided on a center of the diaphragm portion and is fixed to the second substrate through a hole of the fixed electrode. When external force is applied to the sensor, the diaphragm portion displaces upward and/or downward. The external force is detected based on change of electrostatic capacitance. Since the center of the diaphragm portion is fixed by the fixing projection, the maximum displacement region of the diaphragm portion forms a ring, resulting in enhancement of linearity of the sensor output.

11 Claims, 13 Drawing Sheets

FIG. IC
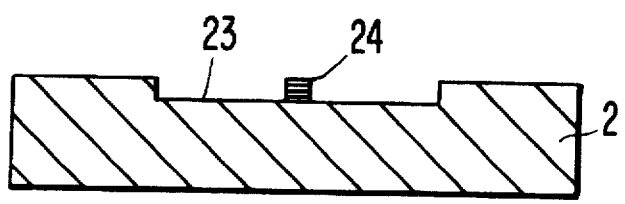

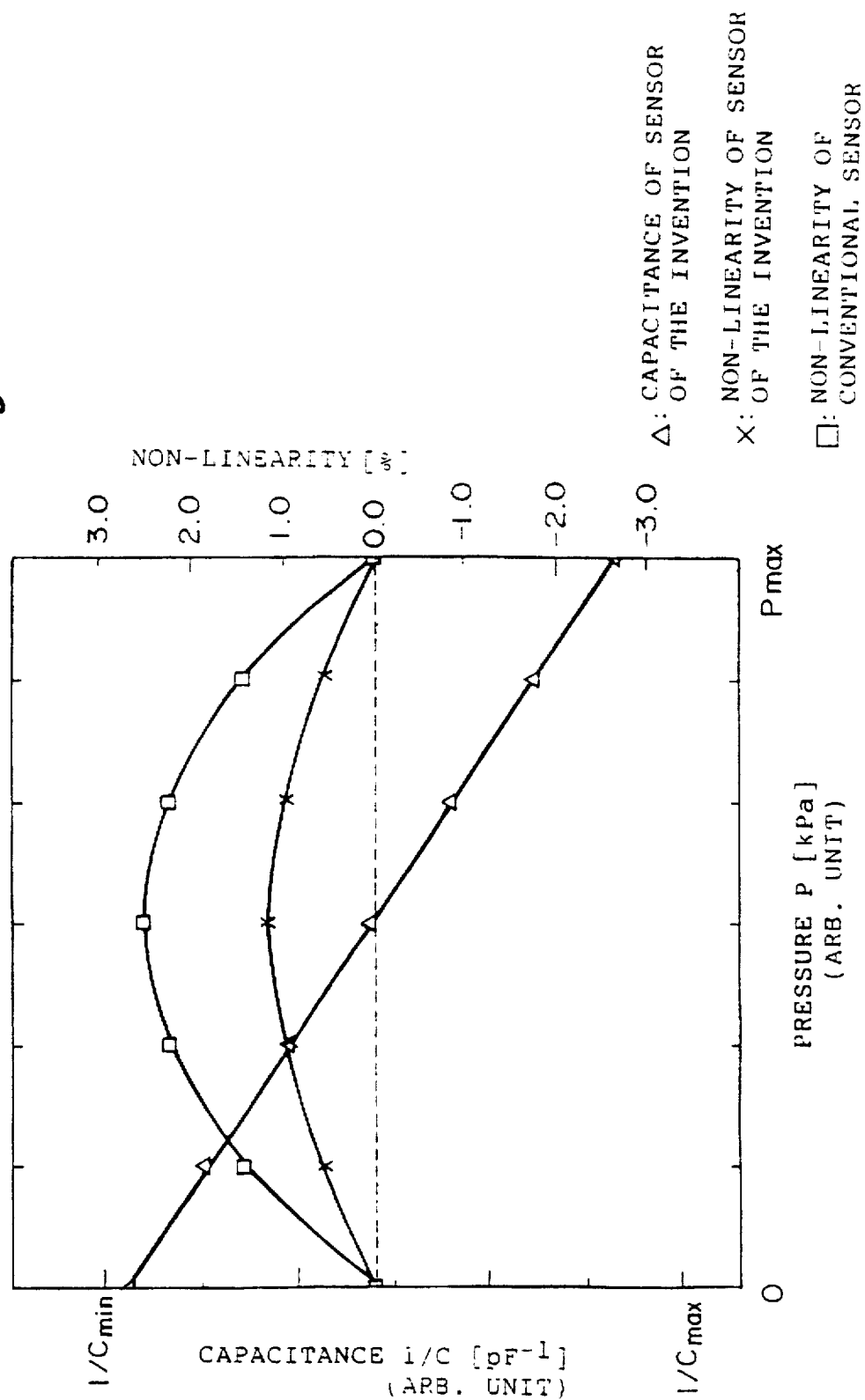

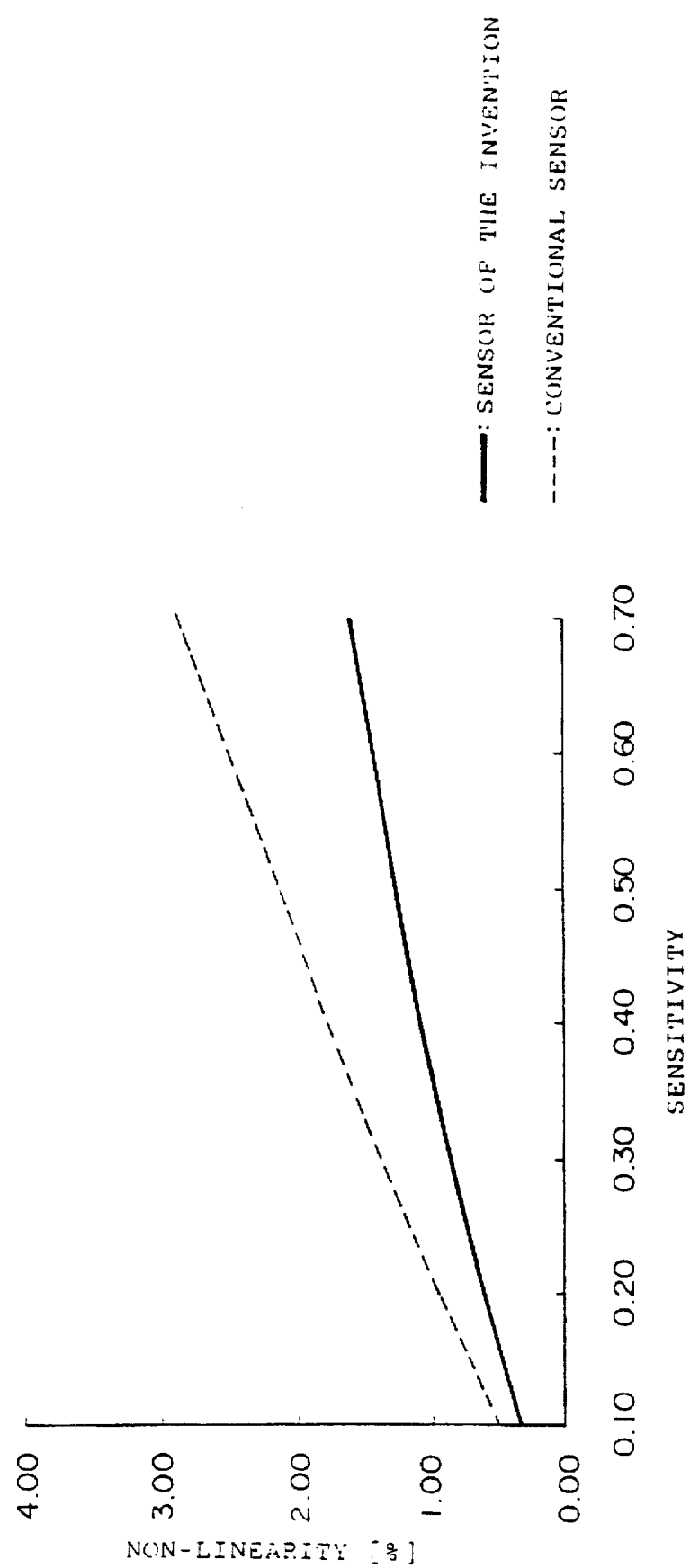

PRIOR ART

PRIOR ART 5,801,313

CAPACITIVE SENSOR

BACKGROUND OF THE INVENTION

1. Field of the Invention

The present invention relates to a capacitive sensor which detects a change of external force based on a change in electrostatic capacitance. The capacitive sensor includes a pressure sensor and an acceleration sensor.

2. Description of the Related Art

A capacitive sensor has the advantage of stability in temperature characteristics in comparison with a piezo type sensor which utilizes piezo resistance elements. Especially, since the capacitive sensors using silicon semiconductor substrates can be manufactured utilizing IC (Integrated Circuit) manufacturing techniques, the sensors show high uniformity. Further the sensors can be small-sized and light weight, and are easily integrated with circuits. Further mass production of sensors with a large-scale batch system makes it possible to realize the price reduction thereof.

FIG. 11 is a sectional view showing an example of conventional capacitive pressure sensors. As a matter of convenience for drawing, and in order to understand drawings easily, the thickness is emphasized in the drawings. The same is true for drawings showing the other example of the prior art and the embodiments of the present invention described later.

A capacitive pressure sensor comprises a silicon semiconductor substrate 60 having conductivity, and a substrate 70 made of an insulating material, such as glass, whose coefficient of thermal expansion is close to that of silicon. The silicon semiconductor substrate 60 is formed with a frame portion (supporting portion) 61 of rectangular-shaped and a thin diaphragm portion 62 which can be deformed by external force.

The semiconductor substrate 60 is coupled with the substrate 70 at the frame portion 61 thereof by anodic bonding. The semiconductor substrate 60 is formed with a recess 63 at the thin diaphragm portion 62 and a gap or spacing is formed between the diaphragm portion 62 and the substrate 70. The diaphragm portion 62 having elasticity displaces upward or downward in the drawing by pressure or acceleration applied thereto externally. Since the diaphragm portion 62 is formed of a silicon semiconductor, it is conductive and is used as a movable electrode.

The substrate 70 is provided with a fixed electrode 71 on the inner surface thereof which faces the diaphragm portion 62. The fixed electrode 71 is made on the substrate 70, preferably, by evaporation of aluminum or the like. The movable electrode 62 and the fixed electrode 71, respectively, are electrically connected to externally connecting terminals (not shown) formed on the substrate 70 through the connecting holes formed in the substrate 70 at suitable portions thereof, respectively, and further connected to a capacitance measuring circuit (a pressure detecting circuit, an acceleration detecting circuit or the like; not shown) through wires bonded to the externally connecting terminals.

When pressure (external force) is applied to the capacitive sensor, the diaphragm portion 62 displaces (vibrates) upward and downward in accordance with the applied pressure. Since the gap between the diaphragm portion 62 and the fixed electrode 71 is changed, electrostatic capacitance C between the electrodes 62 and 71 is changed. An electric signal representing the change in the electrostatic capacitance C or the change in the reciprocal 1/C of the capacitance C (the reciprocal 1/C is generally used as an output of the sensor) is obtained from the capacitance measuring circuit and the pressure (or the acceleration) is detected.

This type of capacitive sensor has the problem of non-linearity of the output characteristics of the reciprocal (1/C) of the electrostatic capacitance. This problem is greater in comparison with that of the piezo type sensor for the following two reasons: (1) the diaphragm (the thin portion) serving as a movable electrode does not make parallel movement (displacement); and (2) an unwanted capacitance arranged parallel with the sensor capacitance exists.

As explained above in (1), in the conventional capacitive pressure sensor, when pressure is applied, the diaphragm portion 62 is bent like a dome. The more the applied pressure is increased, the larger the dome-shaped bending is. Accordingly, the larger the dome shaped bending is, the narrower the range in which the electrostatic capacitance maintains linearity with respect to the applied pressure.

In order to solve the problems mentioned above, in the conventional capacitive sensor, circuits correcting the non-linearity of the output have been provided. Also, in the another method sensitivity is made smaller and the linearity is kept from declining. Both methods, however, cause the electronic circuit to be more complex, the cost to be higher and the miniaturization to be hindered.

In order to extend the range in which the diaphragm portion 62 moves parallel, a mesa-type pressure sensor in which the diaphragm portion 62 is formed as mesa shape is proposed as shown in FIG. 12 (the mesa portion is indicated by the reference numeral 64). Though, the problems are that the diaphragm portion 62 cannot be made smaller since it is necessary to add the correction pattern for forming mesa into the etching mask used when the diaphragm portion 62 is formed; and that the accurate mesa processing is difficult to be performed since the corner of the diaphragm is easily rounded by etching. Therefore, it is difficult to obtain high yield.

A differential system or method has also been considered where the fixed electrodes are formed at a spacing on both sides of the diaphragm, the non-linearity is cancelled by the two electrostatic capacitances, and the non-linearity is made smaller as a whole. Nonetheless, the differential system or method causes the three layer structure which complicates the structure, requires more materials, and requires anodic bonding processes twice. Consequently, the other problems of higher cost and lower yield arise.

SUMMARY OF THE INVENTION

The present invention is to provide a capacitive sensor in which a sensor output having surpassing linearity can be obtained, even the mesa structure is not always formed or the differential system or method is not always utilized (however the mesa structure may be formed or the differential system or method may be utilized and still fall within the spirit and scope of the invention).

A capacitive sensor according to the present invention comprises a first substrate having a thin portion capable of being displaced by external force and a movable electrode formed on the thin portion, and a second substrate having a fixed electrode provided on a position facing the movable electrode, a gap being formed between the movable electrode and the fixed electrode. The capacitive sensor further comprises a fixing member for fixing the center portion of the thin portion so as to prevent the center portion of the thin portion from being displaced.

Pressure is detected in a case where the sensor is a capacitive pressure sensor and acceleration is detected in a case where the sensor is a capacitive acceleration sensor on the basis of the electrostatic capacitance between the movable electrode and the fixed electrode.

According to the present invention, the maximum displacement region of the thin portion exhibits a circle or ring shape by fixing the center portion of the thin portion, and the area of the maximum displacement region is relatively large, so that linearity of the electrostatic capacitance and the reciprocal thereof is enhanced. Further, complicated manufacturing processes and a linearity correcting circuit or the like are not necessarily required, so that the manufacturing cost can be reduced.

In one embodiment of the present invention, at least one of the first and second substrates is formed with a recess for forming the gap, a projection is formed in the recess integrally with the first or second substrate, and the height of the projection is substantially equal to the depth of the recess. Since the fixing member for fixing the center portion of the thin portion can be fabricated simultaneously with the fabrication of the recess (the gap), the capacitive sensor can be manufactured without increasing the manufacturing processes.

In another embodiment of the present invention, the fixing member is a multilayer including at least one insulating layer formed on the first or second substrate. Since the electric insulation between the first and second substrates is assured by the insulating layer included in the fixing member, malfunction occurring due to the leakage current reduces.

The recess is formed, preferably, by etching the silicon oxide film formed by LOCOS (Local Oxidation of Silicon) method. Therefore, preciseness of forming the recess increases and processes for forming the gap are simplified.

Preferably, the lateral cross section of the fixing member and the shape of the thin portion are both circular. Stress distribution which acts on the surface of the thin portion when an external force is applied can be made point symmetry, which leads mechanically stable displacement of the thin portion.

Further preferably, the first substrate is made of a silicon semiconductor, the second substrate is made of glass and the thin portion serves as the movable electrode. The first substrate can be fabricated precisely by semiconductor processes. Since the thin portion is made of a conductive material, it is not necessary to provide the movable electrode separately. Anodic bonding technique is utilized to bond the first and second substrates, and the assembling of the sensor can be simplified.

Both the first and second substrates may be made of a silicon semiconductor. In this case, an insulating layer may be disposed between the first and second substrates. Both the first and second substrates are made of the silicon semiconductor having conductivity, so that the first and second substrates are utilized as the movable and fixed electrodes, respectively, which dispenses with providing electrodes on the substrates and complicated wirings or the like needed for the electrodes. The material of the both substrates is the same and coefficient of thermal expansion thereof is also the same. Consequently, occurrence of a warp of the substrates due to the ambient temperature need not be taken into account.

A differential type capacitive sensor can be obtained by bonding the second substrates to the both sides of the first substrate. Unwanted capacitances in parallel with the sensor capacitance (due to the wirings or the like in the sensor chip and the like) can be cancelled. Highly accurate measurement is possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1b is a plane view partially cut out and FIG. 1c is a cross sectional view of a multilayered fixing projection;

FIG. 3 shows graphs of relations between the pressure P and reciprocal 1/C of capacitance and non-linearity of the reciprocal 1/C of the capacitance with respect to change of the pressure P in the capacitive pressure sensor, and of non-linearity of the reciprocal 1/C of the capacitance with respect to change of the pressure P in a case where no fixing projection is provided;

FIG. 4 is a graph showing relations between sensitivity of a diaphragm portion and non-linearity of reciprocal 1/C of capacitance;

DESCRIPTION OF THE PREFERRED EMBODIMENTS

Figure 1A:
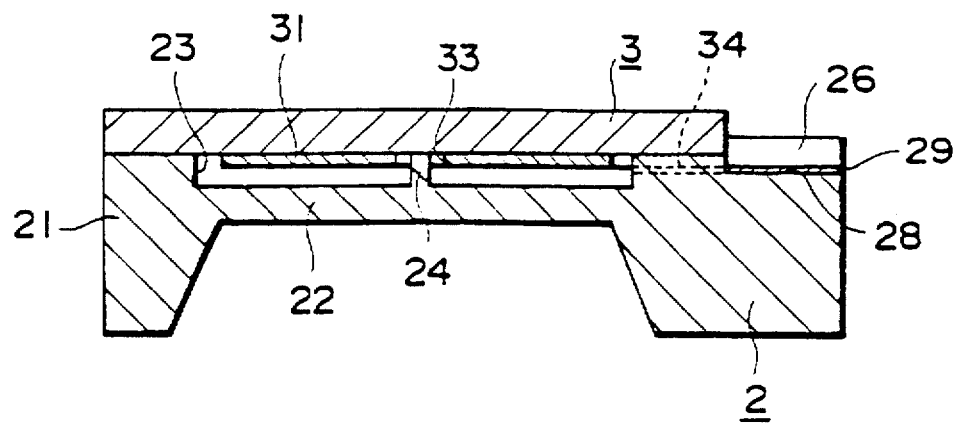
FIG. 1a is a cross sectional view of a capacitive pressure sensor.
Figure 1B:
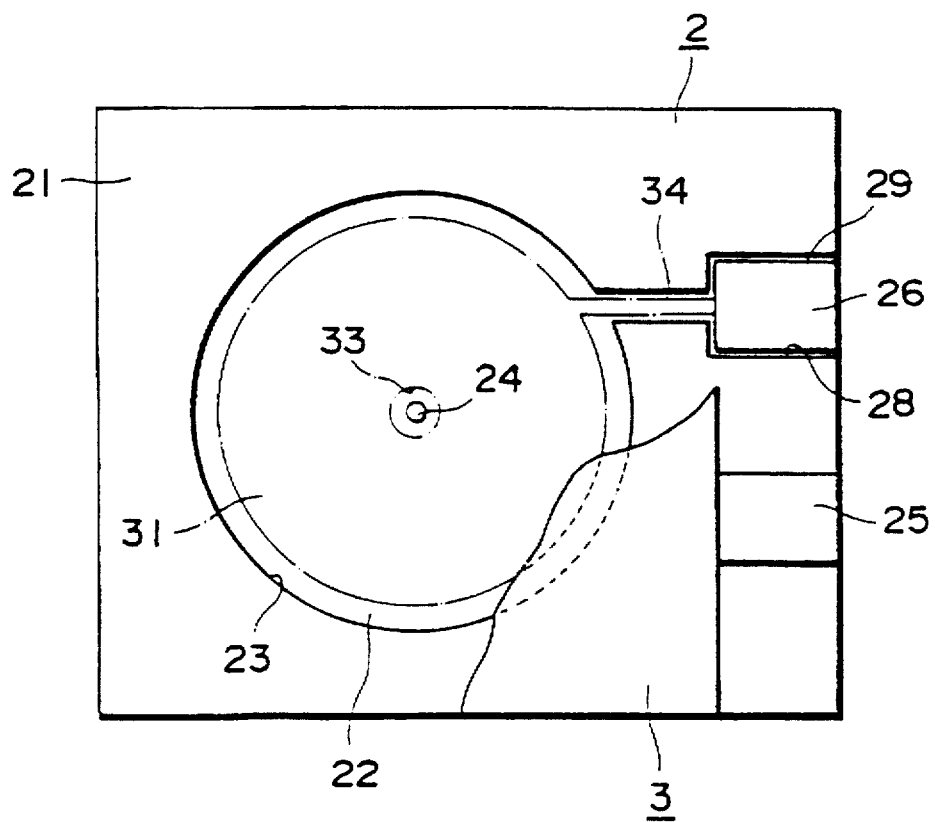

FIG. 1a is a cross sectional view of a capacitive pressure sensor according to an embodiment of the present invention, and FIG. 1b is a plane view partially cut out.

A capacitive pressure sensor comprises a silicon semiconductor substrate (a first substrate) 2 having conductivity (impurities are doped artificially or inevitably) and another substrate (a second substrate) 3 made of an insulating material such as glass.

The silicon semiconductor substrate 2 is formed with a frame portion (supporting portion) 21 having a circular inner periphery, and a thin diaphragm portion (a thin film portion) 22 of circular shaped which receives pressure externally applied. These portions are formed by precisely and perpendicularly etching on the silicon semiconductor substrate 2 using, preferably, alkali echant. The diaphragm portion 22 is not necessarily circular shaped but may be rectangular-shaped (in a case of rectangle, a fixing projection 24 described later may be provided, preferably, on an intersection of diagonals of the rectangle).

The silicon semiconductor substrate 2 is bonded together with the substrate 3 at the upper surface of the frame portion 21 by anodic bonding. The silicon semiconductor substrate 2 is formed with a circular recess 23 at the thin diaphragm portion 22 so that a gap (spacing) is created between the diaphragm portion 22 and the substrate 3. It is preferable that the depth of the gap is smaller than the thickness of the diaphragm portion 22. The gap may be formed by other ways, for example, to form a recess on an inner surface of the substrate 3, to provide a spacer between the frame portion 21 of the silicon substrate 2 and the substrate 3, and others. The diaphragm portion 22 having elasticity displaces (or vibrates) upward and/or downward in FIG. 1a in response to the applied external force. Since the diaphragm portion 22 is made of silicon and has conductivity, it is used as a movable electrode. Impurities may be doped in the surface layer of the diaphragm portion 22 facing the substrate 3 to make the surface have conductivity.

A circular fixed electrode 31 is provided on an inner surface of the substrate 3 which faces the diaphragm portion 22. The fixed electrode 31 is formed by evaporating aluminum and the like on the substrate 3, and is preferably formed slightly smaller than the diaphragm portion 22 in area.

The diaphragm portion 22 is formed integrally with a fixing projection 24 of column shaped at a center thereof. The fixed electrode 31 is cut off at a position corresponding to the fixing projection 24 on the substrate 3 (an area where the fixed electrode 31 is absent is indicated by reference numeral 33). The fixing projection 24 abuts against or is fixed to the substrate 3 in the area 33 (e.g., fixed by anodic bonding).

The fixing projection 24 fixes the center portion of the diaphragm portion 22 so that the center portion does not displace nor move. The fixing projection 24 is formed by a remaining portion corresponding to the projection when the recess 23 is formed by etching the silicon semiconductor substrate 2. Since the fixing projection 24 is made simultaneously with the forming of the recess 23, it is realized without increasing processing steps.

A connecting film 34 extends outward from a part of periphery of the circular fixed electrode 31. The connecting film 34 electrically connects the fixed electrode 31 to an externally connecting terminal (described later) 26 formed on the silicon semiconductor substrate 2 via an insulating layer 29 which will be mentioned later. A groove 28 is formed on the silicon semiconductor substrate 2 at a place facing the connecting film 34 and periphery thereof and at a place where the externally connecting terminal 26 is formed and periphery thereof and the insulating film (glass layer or the like) 29 is formed on the bottom and the sides of the groove 28, in order to prevent the connecting film 34 and the externally connecting terminal 26 from being made contact with the silicon semiconductor substrate 2.

Two externally connecting terminals 25 and 26 are arranged laterally and formed on the upper surface of the silicon semiconductor substrate 2 at one end thereof by evaporating or spattering Al, Au or the like. The terminal 25 is electrically connected to the diaphragm portion (movable electrode) 22 through the silicon semiconductor substrate 2 having conductivity. The terminal 26 is electrically insulated from the silicon semiconductor substrate 2 by the groove 28 and the insulating layer 29 as mentioned, but is electrically connected to the fixed electrode 31 by the connecting film 34. Wires (not shown) are bonded, on one hand, to the externally connecting electrodes 25 and 26 which are electrically separated from each other, respectively, and are connected, on the other hand, to an external electrostatic capacitance measuring circuit (a circuit for detecting acceleration or pressure).

The fixing projection 24 may be formed separately from the diaphragm portion 22. For example, FIG. 1c a multilayer fixing projection 24 is formed at the center portion of the Circular recess 23 so as to have the height equal to the depth of the circular recess 23. At least one layer of the multilayer is made of an insulating material, so that electrical insulation between the substrates 2 and 3 is assured and a malfunction due to a leakage current can be prevented.

A member for fixing the center portion of the diaphragm portion 22 is not necessarily limited to the fixing projection which is provided between the diaphragm portion 22 and the substrate 3. For example, the center portion of the diaphragm portion may be fixed to an external member, an apparatus, a device or a part thereof (a member to which the frame portion of the silicon substrate 2 or the capacitive sensor is attached) by means of a fixing member.

In this embodiment, lateral cross sections of the diaphragm portion 22 and the fixing projection 24 are both circles, so that the distribution of stress acting on the surface of the diaphragm portion 22 can be made point symmetry, and mechanically stable displacement of the diaphragm portion 22 can be realized.

Both the substrates 2 and 3 may be made of a silicon semiconductor and an insulating layer (a glass layer or the like) is provided between the frame portion 21 of the substrate 2 and the substrate 3. By making the substrates 2 and 3 of the silicon semiconductor having conductivity, the substrates themselves are utilized as the movable electrode 22 and the fixed electrode 31, respectively, so that it is not necessary to provide electrodes on the substrates 2 and 3 and complicated wirings on the substrates. Further since the material is the same in the substrates 2 and 3 and coefficient of thermal expansion is also the same therebetween, a warp due to change of the ambient temperature can be prevented.

When acceleration or pressure is applied to the capacitive sensor, the diaphragm portion 22 displaces (or vibrates) upward and/or downward. The gap between the diaphragm portion (movable electrode) 22 and the fixed electrode 31 changes so that electrostatic capacitance C between the electrodes 22 and 31 also changes. An electric signal representing the change in the capacitance C or in the reciprocal thereof 1/C (generally the reciprocal 1/C is used as an output of the sensor) is obtained to detect the acceleration or the pressure.

Figure 2:
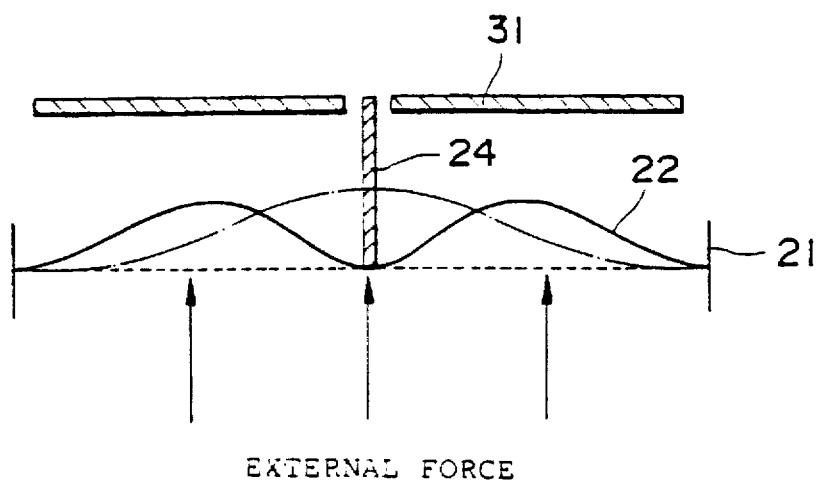
FIG. 2 is a schematic view showing a shape of a diaphragm portion when external pressure (isopressure distribution) is applied to the lower surface of the diaphragm portion.

FIG. 2 schematically shows a shape of the cross section of the diaphragm portion 22 when an external force (isopressure distribution) is applied to the lower surface thereof.

What is indicated by a dot-and-dash line is a shape of the cross section of the diaphragm portion 22 in a (conventional) case where the fixing projection 24 is not provided, and what is indicated by a solid line is a shape of the cross section of the diaphragm portion 22 in a case where the fixing projection 24 is provided.

Since the diaphragm portion 22 is supported at its periphery by the frame portion 21 as described above, the diaphragm portion 22 is flat as indicated by a broken line in the initial state (no pressure is applied). The diaphragm portion 22 bends when external force (isopressure distribution) is applied externally.

In a (conventional) case where no fixing projection is provided, the diaphragm portion 22 bends like a dome as shown by the dot-and-dash line so as to project most at the center portion thereof, when an external force is applied. Accordingly, the portion (the maximum displacement region) of the diaphragm portion 22 which exhibits the largest displacement is only the center portion of the diaphragm portion 22.

In a case where the fixing projection 24 is provided, as the center portion of the diaphragm portion 22 is fixed, the maximum displacement region of the diaphragm portion 22 forms a ring as shown by the solid line. The area of the maximum displacement region largely increases in comparison with the conventional case so that the flatness of the diaphragm portion 22 increases, by which the linearity of capacitance with respect to the applied pressure (the linearity of sensor output) is enhanced.

FIG. 3 shows graphs of relations between the applied pressure P [kPa] and the reciprocal 1/C [pF$^{-1}$] of the electrostatic capacitance C [pF], and non-linearity [%] of the reciprocal 1/C of the capacitance with respect to change of the pressure P, in the capacitive pressure sensor having the above structure, and nonlinearity of the reciprocal 1/C of the capacitance with respect to change of the applied pressure P in the (conventional) case where no fixing projection is provided.

The non-linearity of the reciprocal of the electrostatic capacitance with respect to change of the pressure is given by the following equation:

$$\text{Non-linearity} = \Delta C/[(1/C_{min})-(1/C_{max})] \times 100\%$$

The reciprocal of the minimum capacitance $C_{min}$ is expressed by $1/C_{min}$ and the reciprocal of the maximum capacitance $C_{max}$ is by $1/C_{max}$ in the measurable pressure range (full-range). The symbol $\Delta C$ represents a maximum deviation of a curve expressing relations between the pressure and the reciprocal of the capacitance from an ideal line (a line connecting a point corresponding to $1/C_{min}$ and a point corresponding to $1/C_{max}$).

An equation representing non-linearity of the capacitance with respect to change of the pressure is obtained by replacing $1/C_{min}$ with $C_{max}$ and $1/C_{max}$ with $C_{min}$, respectively.

In FIG. 3, the maximum value of the non-linearity of the reciprocal 1/C of the capacitance is 1.2% in the capacitive pressure sensor in which the center of the diaphragm portion 22 is fixed by the fixing projection 24, whereas the maximum value of the non-linearity of the reciprocal 1/C of the capacitance is 2.5% in the capacitive pressure sensor of the same structure as above except that no fixing projection is provided. The non-linearity of 1/C in the sensor according to the embodiment is made one half that in the conventional sensor.

FIG. 4 is a graph showing relations between sensitivity of the capacitive sensor (ratio of the capacitance when the maximum pressure is applied to the capacitance when the pressure equals to zero) and the non-linearity [%] of the reciprocal 1/C of the capacitance. In this figure, a solid line indicates the case where the fixing projection 24 is provided, whereas a broken line indicates the case where no fixing projection is provided.

The sensitivity of the capacitive sensor is given by the following equation:

$$\text{Sensitivity} = [(1/C_{min})-(1/C_{max})]/(1/C_{min})$$

FIG. 4 is a graph created by obtaining and plotting the sensitivities and the maximum nonlinearities with respect to plurality types of capacitive pressure sensors in which the thickness of the diaphragm portion 22 or the depth of the recess 23 differs from each other (i.e., the sensitivities are different).

The sensitivity of the capacitive sensor decreases when the diaphragm portion 22 is fixed at the center thereof by the fixing projection 24. However, it can be understood that the linearity is enhanced, when the capacitive sensor having the fixing projection 24 is compared with the capacitive sensor having no fixing projection with the same sensitivity as above sensor. The sensitivity of the capacitive sensor can be adjusted by changing the thickness of the diaphragm portion.

Figure 5A:
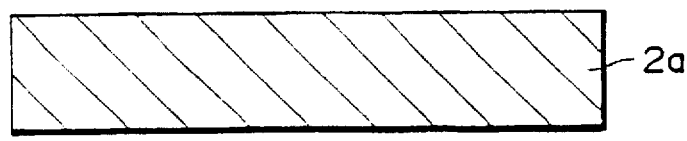
FIG. 5a to FIG. 5f show processes of manufacturing a silicon substrate of a capacitive pressure sensor.
Figure 5B:
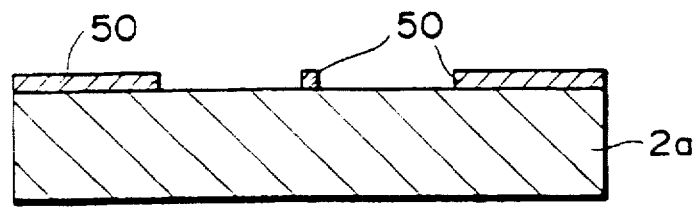
Figure 5C:
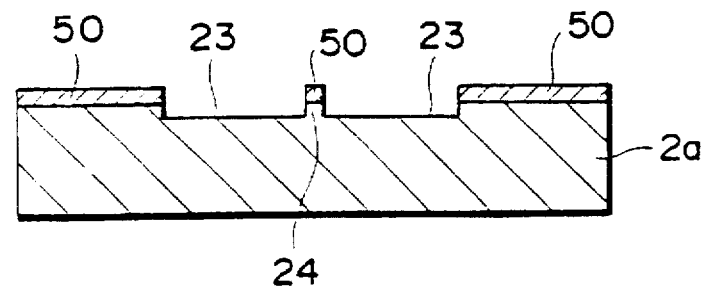
Figure 5D:
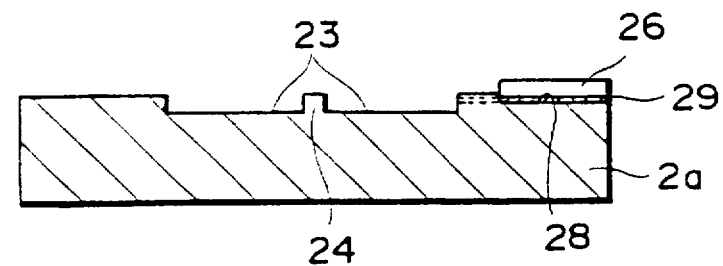
Figure 5E:
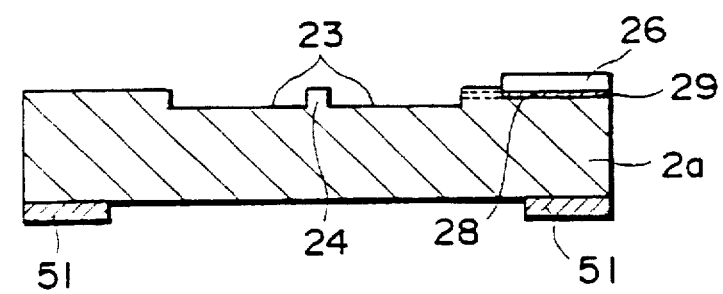
Figure 5F:
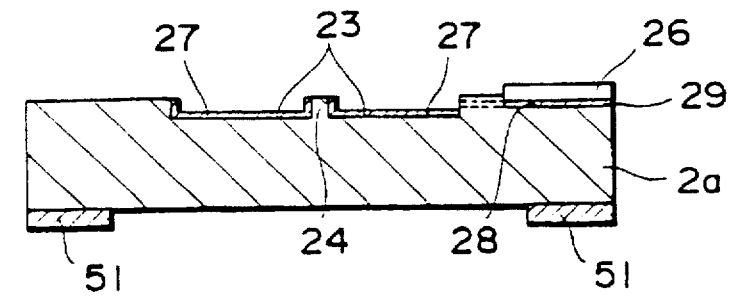
Figure 6A:
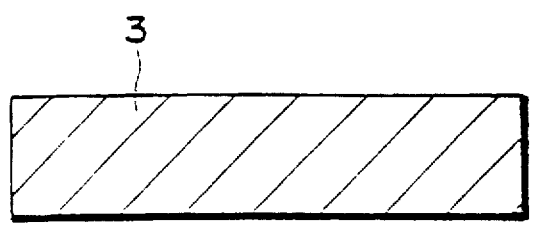
FIG. 6a and FIG. 6b show processes of manufacturing a glass substrate of a capacitive pressure sensor.
Figure 6B:
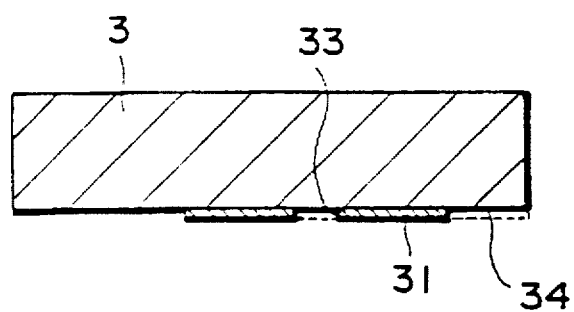
Figure 7A:
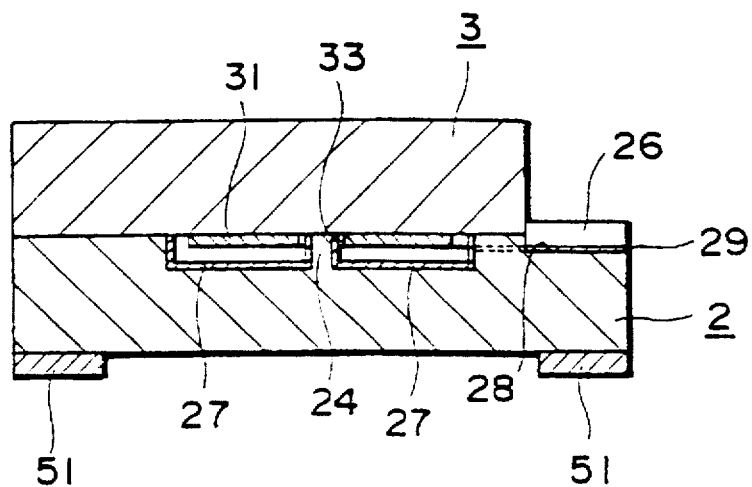
FIG. 7a and FIG. 7b show processes of manufacturing a capacitive pressure sensor.
Figure 7B:
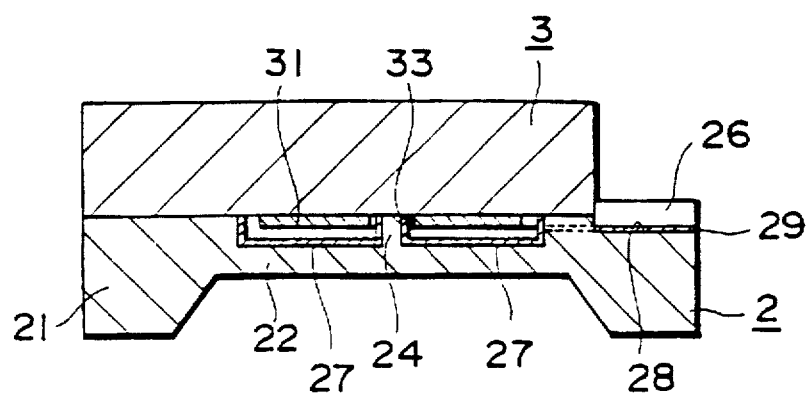

FIGS. 5a to 5f show processes of manufacturing the silicon semiconductor substrate 2, FIGS. 6a and 6b show processes of manufacturing the glass substrate 3, and FIGS. 7a and 7b show processes of manufacturing the capacitive pressure sensor. These are sectional views corresponding to FIG. 1a.

In the manufacturing processes of the silicon semiconductor substrate 2, first a silicon substrate (silicon wafer) 2a is prepared (FIG. 5a), and then masks 50 are fabricated on portions of the silicon substrate 2a where the frame portion 21 and the fixing projection 24 are to be formed (portions to be remained but not to be etched) (FIG. 5b).

The portions of the silicon substrate 2a where the masks 50 are not formed are etched vertically to form the recess 23, by wet etching using alkali aqueous solution such as potassiumhydroxide (KOH) or tetramethylammoniumhydroxide (TMAH), or by dry etching using gas plasma. (FIG. 5c).

In order to lower resistivity of the movable electrode (diaphragm portion) 22, boron (B) is ion-implantated on the surface of the recess 23 of the silicon substrate 2a. Thereafter the masks 50 are removed. The groove 28 is formed on the silicon semiconductor substrate 2a in order to assure the electric insulation between the connecting film 34 and an externally connecting terminal 26, and the silicon semiconductor substrate 2a, and further the insulating layer 29 is formed on the bottom and the side walls of the groove 28.

Further, the terminal 25 used for wire bonding and terminal 26 for connecting the fixed electrode 31 on the glass substrate 3 are formed by spattering aluminum on the silicon substrate 2a (FIG. 5d) Masks 51 used for anisotropy etching to fabricate the diaphragm portion 22 are formed on the lower surface of the silicon substrate 2a by depositing silicon nitride film (SiN film) on the portion which should be remained as the frame portion 21 (FIG. 5e).

Insulating films 27 for protection are deposited on the bottom and the sides of the recess 23 by CVD (Chemical vapor Deposition) technique (FIG. 5f).

In the manufacturing processes of the substrate 3, the glass substrate 3 is prepared (FIG. 6a). The fixed electrode 31 and the connecting film 34 are formed by evaporating aluminum on the glass substrate 3 (FIG. 6b). The aluminum films are removed from the center portion 33 of the fixed electrode 31 where the fixing projection 24 is to be fixed and from the portions where the frame portion 21 is to be bonded.

The substrate 3 and the silicon substrate 2a fabricated as mentioned above are overlapped with each other so that the fixed electrode 31 and the recess 23 face each other and both are bonded by anodic bonding. The frame portion 21 and the fixing projection 24 of the silicon substrate 2a are bonded to the portions of the substrate 3 corresponding thereto (FIG. 7a). The externally connecting terminal 26 is made contact with the connecting film 34 at its end surface to be electrically connected to the fixed electrode 31.

The lower surface of the silicon substrate 2a is etched by anisotropy etching using alkali aqueous solution such as KOH to form the thin diaphragm portion 22. Finally the masks 51 are removed (FIG. 7b).

Although merely the substrates 2a and 3 for fabricating one sensor are shown in FIGS. 5a to 7b, electrodes, recesses and diaphragms for fabricating many sensors are regularly arranged on wafers in actual manufacturing process. Bonded wafers are divided by dicing to produce many capacitive sensor chips.

Figure 8A:
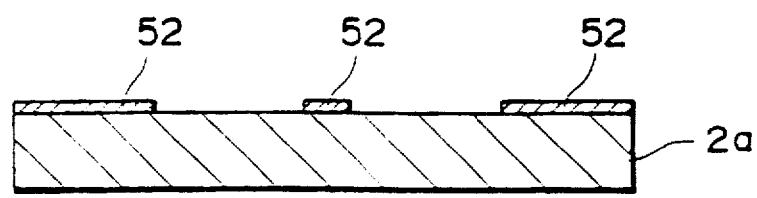
FIG. 8a to FIG. 8c show another example of processes of forming a recess on a silicon semiconductor substrate.
Figure 8B:
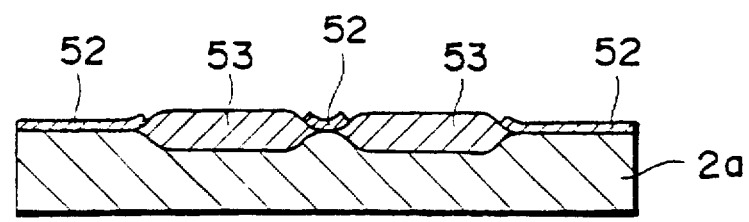
Figure 8C:
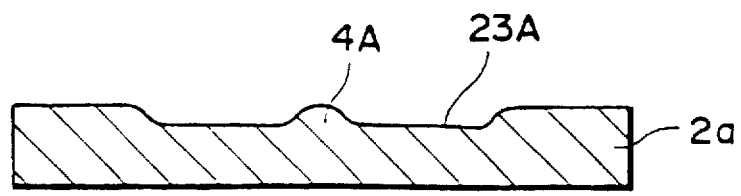

FIG. 8a to 8c show another example of processes for forming a recess on the silicon semiconductor substrate 2.

First, silicon nitride films 52 are deposited on the silicon substrate 2a by the CVD method. The silicon nitride film 52 is removed by etching from an area where the recess 23 is to be formed (FIG. 8a).

Silicon oxide films 53 are fabricated, by LOCOS (Local Oxidation of Silicon) method utilizing the fact that the silicon nitride films 52 have a function of mask against oxygen, on the surfaces of the regions on the silicon substrate 2a where the silicon nitride films 52 are not formed (FIG. 8b).

The silicon oxide films 53 formed by the LOCOS method and the unetched silicon nitride films 52 are removed using hydrofluoric acid to create the recess 23A (FIG. 8c). Processes thereafter proceed in the same way as the processes shown in FIG. 7d and thereafter.

The preciseness of fabricating the recess (the gap) is enhanced and the recess fabricating processes are simplified by utilizing the LOCOS method.

FIG. 9a to 9d show still another example of processes for forming the recess 23 on the silicon semiconductor substrate 2a.

Figure 9A:
FIG. 9a to FIG. 9d show still another example of processes of forming a recess on a silicon semiconductor substrate.
Figure 9B:
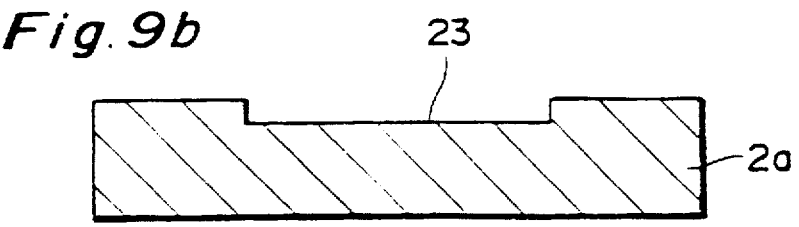

The recess 23 is formed by etching an area of the silicon substrate 2a, the area including a portion where the fixing projection 24 is to be formed (FIG. 9a and 9b).

Figure 9C:
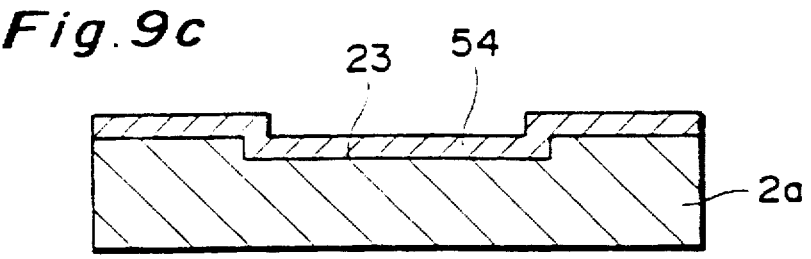
Figure 9D:
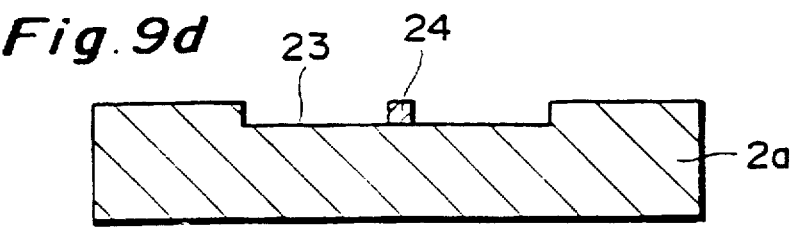

Next, a silicon oxide ($SiO_2$) film 54 is deposited over the whole surface of the silicon substrate 2a with the thickness which is equal to the depth of the recess 23 (FIG. 9c). The silicon oxide film 54 is etched except for the portion where the fixing projection 24 is to be formed, so that the fixing projection 24 remains in the recess 23 (FIG. 9d). Processes thereafter are the same as processes shown in FIG. 7d and thereafter.

Figure 10:
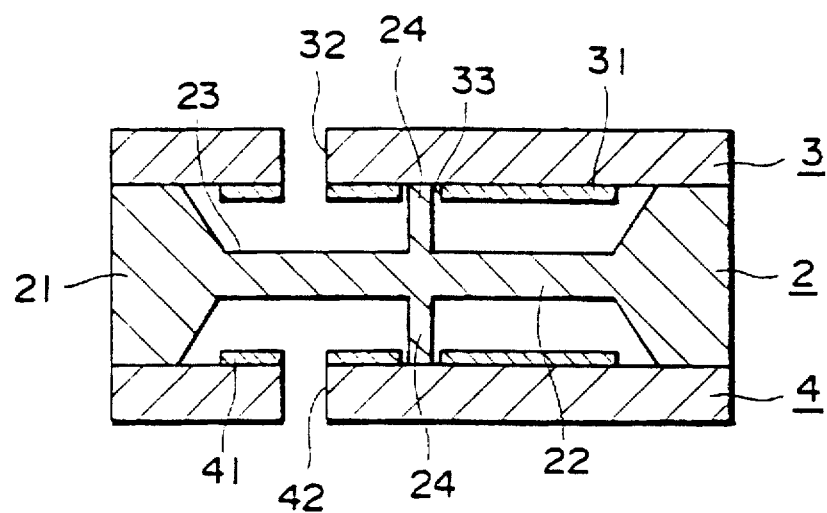
FIG. 10 is a cross sectional view showing a capacitive sensor of differential type.
Figure 11:
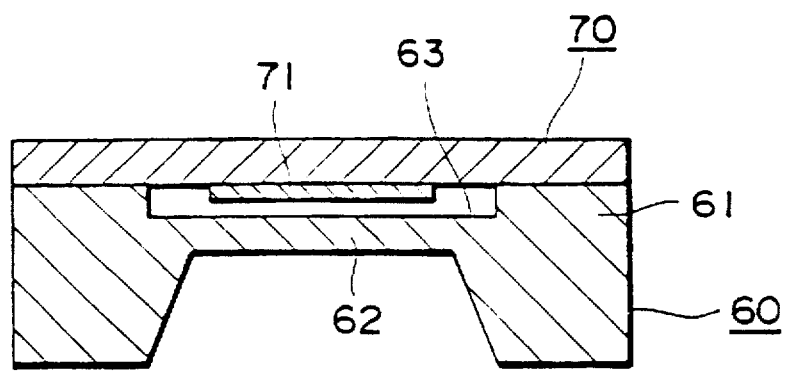
FIG. 11 is a cross sectional view showing a conventional capacitive pressure sensor.
Figure 12:
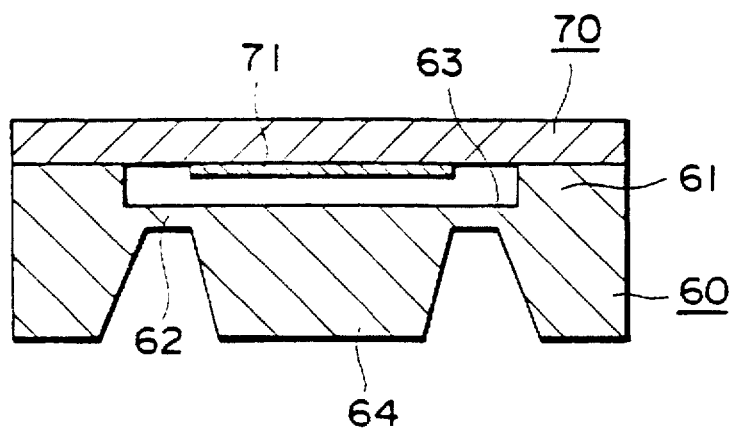
FIG. 12 is a cross sectional view showing another example of a conventional capacitive pressure sensor (mesa type).

FIG. 10 shows an example of capacitive sensor of differential type.

The capacitive pressure sensor of differential type comprises a silicon semiconductor substrate (a first substrate) 2 and two substrates (second substrates) 3 and 4 sandwiching the silicon semiconductor substrate 2. The substrate 4 has the same construction as that of the substrate 3 as described above.

The silicon semiconductor substrate 2 is formed with a frame portion 21 projecting upward and downward and a thin diaphragm portion 22. The silicon semiconductor substrate 2 is bonded with the substrates 3 and 4 by anodic bonding at the upper and lower surfaces of the frame portion 21. The substrates 3 and 4 are provided with pressure introducing inlets 32 and 42 and fixed electrodes 31 and 41, respectively. The diaphragm portion 22 is provided with cylindrical fixing projections 24 respectively projecting upward and downward at the centers of the upper and lower surfaces thereof and the fixing projections 24 are bonded to the upper and lower substrates 3 and 4, respectively. A fixing projection 24 may be provided on only one surface of the diaphragm portion 22.

When reference pressure is introduced into the pressure inlet 42 formed on the one substrate 4, and pressure to be measured is introduced into the pressure inlet 32 formed on the other substrate 3, the diaphragm portion 22 displaces (or vibrates) upward and/or downward in accordance with the difference between the pressures. A gap between the diaphragm portion 22 and the upper fixed electrode 31 and a gap between the diaphragm portion 22 and the lower fixed electrode 41, respectively, change, so that capacitance between the diaphragm portion 22 and the fixed electrode 31 and capacitance between the diaphragm portion 22 and the fixed electrode 41, respectively, change. By taking the difference between the above capacitances, acceleration or pressure is detected.

Further, by taking the difference between the capacitance in accordance with the reference pressure and the capacitance in accordance with the pressure to be measured, unwanted capacitances (due to the wirings or the like in the semiconductor chip) existing in parallel with the above capacitances are canceled, so that more precise sensor can be realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A capacitive sensor for sensing pressure, comprising:
    a first substrate having a thin portion capable of being displaced by external force and wherein said thin portion serves as a movable electrode;
    a second substrate having a fixed electrode provided on a position facing said movable electrode, a gap being formed between said movable electrode and said fixed electrode; and
    a fixing member connected between the first and second substrate for fixing the center of said thin portion so as to prevent the center of said thin portion from being displaced.

2. The capacitive sensor according to claim 1 wherein at least one of said first substrate and said second substrate is formed with a recess, having a depth, for forming said gap, and a projection, having a height, is formed in said recess integrally with said first substrate or said second substrate, the height of said projection being equal to the depth of said recess.

3. The capacitive sensor according to claim 1 wherein said fixing member is a multilayer including at least one insulating layer formed on said first substrate or said second substrate.

4. The capacitive sensor according to claim 1 wherein said capacitive sensor detects pressure based on electrostatic capacitance between said movable electrode and said fixed electrode.

5. The capacitive sensor according to claim 1 wherein said first substrate is made of a silicon semiconductor.

6. The capacitive sensor according to claim 1 wherein said first substrate and said second substrate are made of a silicon semiconductor, and portions of said first substrate and said second substrate serve as said moveable electrode and said fixed electrode, respectively.

7. A capacitive sensor according to claim 1, wherein said fixed electrode is circular and has a center, and wherein said fixing member is attached in the center of said fixed electrode.

8. A capacitive sensor according to claim 1, wherein said thin portion is circular and has a center and a circumference, and wherein said fixing member is attached in the center of said thin portion.

9. A capacitive sensor according to claim 8, wherein said thin portion is thin from the center to the circumference.

10. A capacitive sensor according to claim 1, wherein said first substrate comprises an outer frame disposed around said thin portion, wherein said outer frame has a thickness greater than said thin portion.

11. A capacitive sensor according to claim 1, wherein said thin portion has an approximately uniform thickness, at least for that part of said thin portion in adjacency to said fixed electrode.

* * * * *